United States Patent [19]

Harris

[11] Patent Number: 4,956,424

[45] Date of Patent: Sep. 11, 1990

[54] NOVEL POLY (ALKYLENE CARBONATE) POLYAHLS HAVING MORE THAN ONE PENDANT ACID GROUP

[75] Inventor: Robert F. Harris, Midland, Mich.

[73] Assignee: The Dow Chemical Company, Midland, Mich.

[21] Appl. No.: 353,724

[22] Filed: May 18, 1989

Related U.S. Application Data

[62] Division of Ser. No. 914,686, Oct. 2, 1986, Pat. No. 4,879,357.

[51] Int. Cl.$^5$ ............................................ C08F 283/02
[52] U.S. Cl. ............................................ 525/462; 525/461; 558/262; 558/265; 558/266; 558/268; 528/271; 528/360; 528/370
[58] Field of Search ............... 525/461, 462; 528/271, 528/360, 370; 558/262, 265, 266, 268; 252/351, 353, 354, 356

[56] References Cited

U.S. PATENT DOCUMENTS

| | | | |
|---|---|---|---|
| 3,248,414 | 4/1966 | Stevens | 558/266 |
| 3,248,415 | 4/1966 | Stevens | 558/266 |
| 3,248,416 | 4/1966 | Stevens | 558/266 |
| 3,313,782 | 4/1967 | Springmann et al. | 528/371 |
| 3,332,980 | 7/1967 | Leary et al. | 558/275 |
| 3,632,828 | 1/1972 | Frevel et al. | 558/276 |
| 3,689,462 | 9/1972 | Maximovich | 528/371 |
| 3,896,090 | 7/1975 | Maximovich | 528/371 |
| 4,072,704 | 2/1978 | Langdon | 558/266 |
| 4,191,705 | 3/1980 | Lindner et al. | 558/267 |
| 4,267,120 | 5/1981 | Cuscurida et al. | 558/267 |
| 4,330,481 | 5/1982 | Timberlake et al. | 558/266 |
| 4,353,834 | 10/1982 | Langdon | 260/404.5 |
| 4,382,014 | 5/1983 | Sakai et al. | 262/356 |
| 4,415,502 | 11/1983 | Timberlake et al. | 558/266 |
| 4,476,293 | 10/1984 | Robinson | 528/76 |
| 4,488,982 | 12/1984 | Cuscurida et al. | 262/174.21 |
| 4,504,418 | 3/1985 | Langdon | 558/265 |
| 4,686,273 | 8/1987 | Harris | 528/196 |
| 4,686,274 | 8/1987 | Harris et al. | 528/196 |
| 4,709,069 | 11/1987 | Harris | 558/205 |
| 4,745,162 | 5/1988 | Harris | 525/461 |
| 4,795,810 | 1/1989 | Harris | 528/370 |
| 4,816,529 | 3/1989 | Harris | 525/453 |

FOREIGN PATENT DOCUMENTS 2712162 3/1977 Fed. Rep. of Germany .

Primary Examiner—John Kight, III
Assistant Examiner—Anang Sridharan

[57] ABSTRACT

Poly(alkylene carbonate) polyahl polymers containing two or more acid-terminal moieties are disclosed. Acid-terminal polyahls provided herein are useful as surfactants or as intermediates for the syntheses for other polymers.

15 Claims, No Drawings

NOVEL POLY (ALKYLENE CARBONATE) POLYAHLS HAVING MORE THAN ONE PENDANT ACID GROUP

CROSS-REFERENCE TO RELATED APPLICATION

This is a divisional of 914,686, filed Oct. 2, 1986 now U.S. Pat. No. 4,879,357.

BACKGROUND OF THE INVENTION

1. Field of the Invention This invention relates to poly(alkylene carbonate) polyahls.

2. Description of the Background Poly(alkylene carbonate) polyahls are randomized polymers containing active hydrogen end groups and alkylene carbonate moieties and ether moieties such as di- and higher polyalkylenoxy units. An alkylene carbonate moiety is a repeating unit comprising an alkylene group bound to a carbonate moiety. Some of the known poly(alkylene carbonate) polyahls are non-ionic surfactants. In 1978, DE 2,712,162 to Stuehler disclosed non-ionic surfactants containing carbonate moieties in the backbone. A variety of surfactants have been prepared by Lanqdon and described in a series of patents. U.S. Pat. No. 4,072,704 described the coupling of polyethylene glycols and polypropylene glycols with either dialkyl carbonates or formaldehyde to give materials with surface active properties. In U.S. Pat. No. 4,353,834, it was described how long chain amides or sulfonamides have been coupled with hydrophilic polyglycols using dialkyl carbonates or esters of dicarboxylic acids to give materials with surface active properties. This work was extended in U.S. Pat. No. 4,504,418 to include polyoxyalkylene polymers and alcohols coupled by alkyl carbonates or esters of dicarboxylic acids to give materials with surface active properties. U.S. Pat. No. 4,330,481 to Timberlake et al. described the preparation of surfactants by reacting alcohols or alcohol ethoxylates with ethylene carbonate. These products were then further reacted with ethylene oxide to produce different surface active materials as reported in U.S. Pat. No. 4,415,502. The preparation of surfactants and functional fluids by reacting alcohols, phenols or carboxylic acids (or their alkoxylated derivatives) with alkylene carbonates or alkylene oxides and carbon dioxide was described in U.S. Pat. No. 4,488,982 to Cuscurida.

U.S. Pat. No. 4,382,014 to Sakai et al. described the preparation of surface active materials by reacting alcohols, carboxylic acids or primary or secondary amines containing four or more carbon atoms or substituted phenols with alkylene carbonates in the presence of an -ate complex of a metal of Group II, III or IV of the Periodic Table having at least two alkoxyl groups. Low molecular weight polyoxyethylene glycol monomethyl ethers have been coupled using phosgene or alkyl carbonates to give materials useful in formulating brake fluids and as synthetic lubricants, as disclosed in U.S. Pat. No. 3,632,828. The coupling of monofunctional alcohols, phenols or their ethoxylated derivatives using diphenyl carbonate to give surfactants was disclosed in U.S. Pat. No. 3,332,980.

In 1981, U.S. Pat. No. 4,267,120 to Cuscurida et al described polyester polycarbonates terminated with hydroxyl groups obtained by the reaction of a cyclic organic acid anhydride, a 1,2-epoxide, carbon dioxide and a polyhydric compound in the presence of a basic catalyst. The Cuscurida et al polymers are hydroxy-functional materials. In the Cuscurida et al patent, the cyclic anhydride is present during polycarbonate preparation and is therefore chemically incorporated into the polymeric backbone.

The applications of non-ionic poly(alkylene carbonate) polyahl surfactants are limited due to their very poor water solubility and wetting times. In addition, these non-ionic surfactants also form poor foams evidencing poor foam stability, which in specific instances may be an advantage or a disadvantage depending on the particular application. Further, fairly high concentrations of these non-ionic surfactants are required before any surface active properties, like lowering the surface tension of water, are evidenced.

Unfortunately, conventional non-ionic poly(alkylene carbonate) polyahls are not as efficient surfactants as are desired for certain applications. Therefore, there still is a need for more efficient poly(alkylene carbonate) polyahl surfactants which retain the beneficial characteristics of conventional poly(alkylene carbonate) polyahls such as biodegradability.

SUMMARY OF THE INVENTION

The present invention relates to a novel, acid-functional poly(alkylene carbonate) polyahl having more than one pendant acid moiety or salts thereof. For the purposes of this invention, the term "acid-functional polymer" encompasses polymers having on the average more than one acid moiety, salt moiety or combination thereof per polymer molecule. A group of preferred polymers have two pendant acid moieties. These difunctional polymers and salts thereof are effective anionic triblock surfactants.

In addition, this invention includes poly(alkylene carbonate) polyahls having three or more, and up to about and including eight, pendant acidic moieties.

The acid-functional polymers having from about two to four acid moieties are particularly useful as intermediates for preparing other monomers and polymers. As such, they can be further reacted, e.g., with polyols to produce polyesters, with polyamines to produce polyamides or with epoxy resins to produce modified epoxy resins.

The surfactant properties of the present products, i.e., the acid-functional poly(alkylene carbonate) polyahls having a terminal acidic group or salts thereof, can be varied by varying the molecular weight and the backbone structure of the polymers, the length of the substituents, the type of the terminal acidic moieties and the molar ratio of the reactants.

The carbonate backbone of the anionic surfactants of the present invention can be degraded by bases, strong acids or by biodegradation. Accordingly, they will be degrade naturally and will not persist in the environment. This is an extremely advantageous characteristic, already required by law in many localities.

DETAILED DESCRIPTION OF THE INVENTION

The novel compositions of this invention combine useful surfactant properties of non-ionic surfactants such as non-ionic poly(alkylene carbonate) polyahls with improved properties obtainable from anionic surfactants. The anionic properties are imparted to the present polymers by the salt forms of terminal acidic moieties appended to the polycarbonate backbone thereof. The present acid-functional surfactants and acid-functional polymer intermediates can be degraded by bases, strong acids or under biodegradative conditions. This makes them fugitive and biocompatible since they do not persist in the environment.

The combination of a non-ionic backbone and the terminal acidic moieties renders the present polymers superior surfactants, and that, at much lower concentrations than the non-ionic polymers from which the present surfactants are derived. This, in turn, provides a significant economic advantage in terms of materials and cost savings. Additionally, the present acid-functional polymers evidence increased water solubilities when compared with their non-ionic counterparts. This can translate into new applications of the surfactants as well as easier handling thereof. Moreover, the increased surface active and water soluble characteristics of the present acid-functional polymers also result in decreased wetting times when compared with the corresponding non-ionic polymers. Some of the present acid-functional polymers also afford higher foam height and foam stabilities than those of the corresponding non-ionic polymers.

The present acid-functional polymers are cost-effective surfactants. In general, the most expensive portion of a surfactant molecule is the hydrophobic portion. In a large number of commercially important surfactants, this portion is commonly derived from fatty alcohols or fatty acids. This accounts for the high cost of manufacturing the prior art surfactants. Somewhat less expensive surfactants are those derived from poly(propylene oxides) as the source of the hydrophobic portion. The surfactants of this invention derive their hydrophobic nature from the content of carbon dioxide in their backbone. Since $CO_2$ is among the least expensive sources which can be used as the hydrophobic portion of a surfactant, the acid-functional surfactants of this invention are extremely cost-effective.

In addition to their lower cost, a significantly lower amount thereof is required than of the corresponding non-ionic surfactants from which they are derived, which make the present acid-functional surfactants still more economically attractive. Since these surfactants contain $CO_2$ in their backbone, they are fugitive and do not persist in the environment. They can be readily degraded by bases, strong acids or by biological degradation to water soluble, non-surface active materials. These novel acid-functional polymers can be produced by the reactions of poly(alkylene carbonate) polyahls with acid donor materials.

Poly(alkylene carbonate) polyahls are randomized polymers having a plurality of carbonate moieties and a plurality of active hydrogen moieties and optionally other moieties such as di- and higher polyalkyleneoxy units. An alkylene carbonate moiety is a repeating unit which has an alkylene group bound to a carbonate moiety. An active hydrogen moiety is a moiety containing an hydrogen atom which, because of its position in the moiety, displays significant activity according to the Zerewitnoff test described by Kohle, J. Amer. Chem. Soc. 49:3181 (1927). Illustrative of such active hydrogen moieties are —COOH, —OH, —NH$_2$, —NH—, —CONH$_2$, —SH and —CONH—. Alkyleneoxy moiety refers herein to a repeating unit which has an alkylene group bound to oxygen. Alkylene carbonate and alkyleneoxy moieties are respectively represented by the following formulae

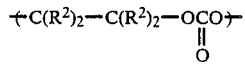

and

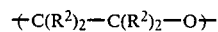

and wherein $R^2$ is as hereinafter defined. Preferred poly(alkylene carbonate) polyahls are random polymers represented by the formula:

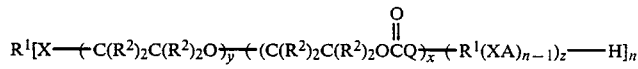

wherein $R^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH, $$-\underset{\text{O}}{\overset{\text{O}}{\text{C}}}-, \quad -\underset{\text{O}}{\overset{\text{O}}{\text{OC}}}-, \quad \text{or} \quad -\underset{\text{O}}{\overset{\text{O}}{\text{OCNH}}}-;$$

A is separately in each occurrence

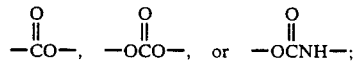

combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class of poly(alkylene carbonate) polyahls are poly(alkylene carbonate) polyols generally corresponding to the aforementioned formula wherein $R^1$, $R^2$, and n are as previously defined; X is oxygen; x is separately in each occurrence an integer of from 2 to 10; y is separately in each occurrence an integer of from 5 to 15 and z is an integer of from 0 to 2; provided that the ratio of y to x is from 1:1 to 3:1.

In the hereinbefore-defined formulas, $R^1$ is preferably an aliphatic or cycloaliphatic hydrocarbon containing one or more oxygen, nitrogen or sulfur moieties; $R^1$ is more preferably an n valent alkane or cycloalkene, or an n valent alkane or cycloalkane containing one or more oxygen, nitrogen or sulfur moieties; $R^1$ is even more preferably an n valent $C_{1-14}$ alkane or an n valent $C_{1-14}$ alkane substituted with one or more oxygen moieties. $R^2$ is preferably hydrogen, $C_{1-20}$ alkyl, $C_{1-20}$ haloalkyl, $C_{1-20}$ alkenyl or phenyl; $R^2$ is more preferably hydrogen, $C_{1-3}$ alkyl, $C_{2-3}$ alkenyl or phenyl; $R^2$ is even more preferably hydrogen, methyl or ethyl; $R^2$ is even more preferably hydrogen or methyl, and, most preferably, hydrogen. X is preferably S, O or NH and X is most preferably O. Preferably, n is an integer of 1 to 10, inclusive, more preferably, 1 to 5, inclusive, and, most preferably, 1 or 2.

As used herein, the term "polyahl" includes polyfunctional compounds having on average more than 1 active hydrogen moiety as defined hereinbefore. Specifically included within the definition of polyahl are polyols, polyamines, polyamides, polymercaptans and polyacids. Examples of polyahls suitable for use in the instant invention may be found in U.S. Pat. No. 4,465,713 at column 2, line 42 through column 5, line 17. Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalyst or metal salt of an alkaline compound. Examples of these poly(alkylene carbonate) polyols and methods for preparing these polyols are contained in U.S. Pat. No. 3,896,090 to Maximovich, U.S. Pat. No. 3,689,462 to Maximovich, U.S. Pat. No. 3,313,782 to Springmann, U.S. Pat. Nos. 3,248,414, 3,248,415and 3,248,416 to Stevens and co-pending application Serial No. 750,362, filed on July 1, 1985, all incorporated in their entireties herein by reference. Alternatively, the poly(alkylene carbonate) polyahls can be prepared by reacting a dialkyl or diaryl carbonate with an initiator with two or more hydroxyl moieties. See, for example, U.S. Pat. No. 4,476,293 and U.S. Pat. No. 4,191,705, incorporated herein by reference.

The poly(alkylene carbonate) polyahls used as starting materials may also contain the residue of an initiator as well as unreacted starting materials and other relatively volatile reaction products.

The poly(alkylene carbonate) polyahl starting materials can be modified with other active hydrogen compounds prior to reaction with acid donor materials by the processes of U.S. applications Ser. Nos. 799,211 filed on Nov. 18, 1985; 750 362 809,675 filed on Dec. 16, 1985; 831,761 filed on Feb. 21, 1986 and 885,118 filed on July 14, 1986 by the present inventor, all of which are herein incorporated in their entireties by reference.

Organic compounds suitable as modifiers for modifying poly(alkylene carbonate) polyahls according to this invention are polyfunctional materials which are reactive with the carbonate and/or active hydrogen moieties of poly(alkylene carbonate) polyahls.

Most polyahls are reactive with the carbonate moieties of poly(alkylene carbonate) polyahls. Typical polyahls include polyols, polyamines, polyamides, polymercaptans and polyacids.

The polyols are preferred amongst the foregoing polyahls. Examples of such polyols are polyol polyethers, polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, amines including aromatic, aliphatic and heterocyclic amines, polyamines and mixtures thereof. Alkylene oxide adducts of compounds which contain two or more different groups within the above-defined classes may also be used such as amino alcohols which contain an amino group and a hydroxyl group. Alkylene adducts of compounds which contain one —SH group and one —OH group as well as those which contain an amino group and a —SH group may also be used. A variety of amines can function as the modifier. Any polyfunctional amino compound can be used that is less volatile than the dialkylene glycol, trialkylene glycol or initiator molecule that is being removed during molecular weight advancement. A preferred class of polyamines are those prepared by the reductive amination of polyols. Examples of such polyamines can be found in U.S. Pat. No. Nos. 3,128,311; 3,152,998; 3,347,926; 3,654,370; 4,014,933 and 4,153,581.

It is preferred to remove the catalysts used to prepare the starting poly(alkylene carbonate) polyahls prior to the performance of the present process. However, in some cases the catalyst is advantageously retained in the poly(alkylene carbonate) polyahl and is used to catalyze reaction wit acid donor materials. The acid donor materials capable of reacting with the poly(alkylene carbonate) polyahls to add terminal acidic compounds known in the art. Suitable acid-terminal moieties are —COOH, —SO$_2$H, —SO$_3$H, —SO$_4$H, —PO$_4$H$_2$, -PO$_3$H$_2$ or sulfosuccinates. The following are provided by means of example of acid donor materials.

Cyclic anhydrides selected from the group consisting of alkylcyclic anhydrides, cycloalkylcyclic anhydrides, arylcyclic anhydrides, alkylaryl cyclic anhydrides and aralkylcyclic anhydrides. Among these, more preferred are $C_{4-24}$ alkylcyclic anhydrides, $C_{8-24}$ cycloalkylcyclic anhydrides, $C_{8-24}$ aralkylcyclic anhydrides and $C_{8-24}$ alkylarylcyclic anhydrides. The anhydrides may be further substituted with halogens, alkyl, alkyl carbonyl and aryl, among other substitutents. Examples include succinic anhydride, maleic anhydride, phthalic anhydride, bromomaleic anhydride, dichloromaleic anhydride, dimethylmaleic anhydride, dimethylsuccinic anhydride, 2-dodecen-1-yl succinic anhydride, glutaric anhydride, heptanoic anhydride, hexanoic anhydride, homophthalic anhydride, 3-methylglutaric anhydride, methylsuccinic anhydride and 2-phenylglutaric anhydride. The most preferred anhydrides are succinic anhydride, maleic anhydride and phthalic anhydride. However, any anhydride can be used which is capable of reacting with a monofunctional alcohol, mercaptan, carboxylic acid or primary or secondary amine to provide a terminal carboxylic acid moiety.

The formation of sulfosuccinates is a special case of cyclic anhydride reactions. A poly(alkylene carbonate) polyahl is allowed to react with maleic anhydride and sodium bisulfite. A sulfosuccinate has the following structure:

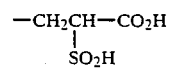

Other types of compounds capable of adding a terminal acidic group to the non-ionic polymers are compounds containing sulfonic acid, sulfinic acid or sulfuric acid terminal moieties and salts thereof. By means of example, halosulfonic acids and salts thereof, such as chlorosulfonic acid, sodium chlorosulfonate and chloroethylsulfonic acid can be used. Preferred among these are chlorosulfonic acid, chlorosulfinic acid and chloroethylsulfinic acid. Still another group of compounds capable of adding an acidic group to a polymer to form the present acid-functional polymers are, e.g., halocarboxylic acids and salts thereof such as chloroaoetic aoid, sodium chloroacetate, bromoacetic acid, and chloropropionic acid. Most preferred is monochloroacetic acid. Still another group of compounds capable of adding a terminal acidic group are, e.g., inorganic acid anhydrides such as $P_2O_5$ and $SO_3$. In general, any compound capable of adding a terminal acidic group to non-ionic poly(alkylene carbonate) polyahls without degrading such adduct is suitable for use within the present context. The addition of the acidic terminal group to the poly(alkylene carbonate) polyahl is dependent on the nature of the acid donor and the poly(alkylene carbonate) polyahl. By means of example, the reaction of the substrate polyahls with a carboxylic acid moiety-adding compound will be described in general terms. However, the general requirements are extendable to the reactions adding to the polyahls other terminal acid-functional groups, as well. Cyclic carboxylic acid anhydrides are the most preferred class of materials used to add a terminal acidic group. Reaction is carried out by contacting a poly(alkylene carbonate) polyahl as defined above with a cyclic carboxylic acid anhydride at temperatures from about 80° C. to 180° C. for a period of minutes to about hours. Optionally, a basic catalyst such as an alkali metal or alkaline earth metal carbonate, alkoxide, stannate or borate, or a tertiary amine can be used to increase the reaction rate, if desired. Preferably, a catalyst is not used, thereby eliminating the need for catalyst removal after reaction. The molar ratio of active hydrogen groups on the poly(alkylene carbonate) polyahl to the cyclic carboxylic acid anhydride can be about 1:1 or greater, provided that more than one acid moiety is incorporated per molecule. This reaction which chemically incorporates a carboxylic acid-functional moiety on the end of the poly(alkylene carbonate) polyahl is preferrably carried out in the absence of a solvent and the product can be used for many applications without further purification. The reaction may, however, be conducted in the presence of inert solvents, if desired. Conversion of the cyclic carboxylic acid anhydride is near 100% in most cases. Progress of the reaction can be conveniently followed by monitoring the disappearance of the cylic anhydride by size exclusion chromatography, or infrared or nuclear magnetic resonance techniques. When haloacids are used as the source of the acid moiety, they can be added to the poly(alkylene carbonate) polyahl in a solvent, such as methylene chloride, in the presence of a compound capable of acting as an acid acceptor, such as pyridine or triethylamine. The thus obtained product can be recovered after neutralization, removal of by-product salt and solvent stripping. A variety of known neutralizing substances can be used to obtain the salts of the novel acid-functional polymers, such as alkali metal salts, alkaline earth metal salts, amine salts such as alkyl ammonium, cycloalkyl ammonium, alkylaryl ammonium, aryl ammonium and aralkyl ammonium salts, and ammonium salts. The choice of the particular neutralizing agent used depends to a great extent on which particular salt is required for a specific application since different salts may have widely different compatibilities with other materials in end use applications. Amines such as ammonia, methylamine, dimethylamine, trimethylamine, ethylamines, propylamines, butylamines and longer chain alkylamines (up to $C_{20}$ alkylamines) are one preferred class of materials. However, others outside of this range may also be used. Among the alkali metal salts, lithium, sodium and potassium are most preferred. Among the alkaline earth metal salts, calcium and magnesium are most preferred. The method of neutralizing the acid-functional poly(alkylene carbonate) polyahl is important. When strong bases such as alkali metal hydroxides are used, it is important that local excesses of the hydroxides are never present during the neutralization since such conditions lead to hydrolysis of the poly(alkylene carbonate) polyahl backbone. Amines such as ammonia are particularly useful since local excesses do not lead to backbone hydrolysis. Typically, the neutralizing agent is added slowly to the acid-functional poly(alkylene carbonate) polyah while monitoring the pH of the product. In this way any desired percentage of the acid moieties can be neutralized up to 100%. The characteristics of the novel acid-functional poly(alkylene carbonate) polyahl polymers including their salts can be modified by adjusting the proportion of non-ionic poly(alkylene carbonate) polyahl to the acid group donor compound. A different proportion of ionic to non-ionic characteristics may be desirable for particular applications of the polymer. Thus, when a polymer product having a high anionic characteristic is desired, the ratio of non-ionic polymer to acid group donor may be about 1:1. This will provide a complete conversion of the non-ionic polymer to the anionic polymer. However, other applications may require a different balance of non-ionic and anionic surfactant capabilities. In some cases a material may be required that has some acid functionality and some hydroxyl or amino functionality as in the case of a chemical intermediate. In such cases, a partial conversion of the non-ionic polymer to the anionic form may be desirable, whereby some non-ionic and some anionic moieties are present in the product. The proportion of non-ionic polymer to acid group donor may be as high as desired. As long as there are, on the average, greater than one acid-functional group per molecule of poly(alkylene carbonate) polyahl. A particularly useful range of proportions of the non-ionic polymer to the acid group donor is between about 1:1.1 and 1:8, more preferably between about 1:2 and 1:4.

The characteristics of the novel acid-functional polymers and their salts can be varied by adjusting, for example, the proportion of the amount of the acid-functional moieties that are converted to salts and the amount present as free acids. Only partial neutralization may be preferred in some cases.

One preferred class of compositions of the present invention are those compositions which can function as triblock surfactants. These compositions have a poly(alkylene carbonate) backbone and two acid-functional end groups. Such compositions are preferably used in their salt forms and function as anionic surfactants.

Another preferred class of compositions are those produced from modified poly(alkylene carbonate) polyahls. These compositions have a random arrangement of both poly(alkylene carbonate) moieties and modifier moieties in their backbone. In this way, the structure of the backbone can be adjusted to give the required hydrophobic properties for a given application. The acid-functional end groups are the source of the hydrophilic properties, particularly those present as salts.

The modified poly(alkylene carbonate) backbone materials are also useful when a particular compatibility of the surfactant backbone with a particular phase or substrate is required. The backbone can be modified in such a way as to enhance or to minimize such compatibilities.

As polymer intermediates, the degree and type of modifier or modifiers used in the backbone of a modified poly(alkylene carbonate) polyahl can have a substantial effect on final polymer properties.

In some cases, a mixture of the present acid-functional polymers with a different non-ionic polymer may be the more suitable solution. For such purposes, an additional non-ionic surfactant may be physically blended in after the present anionic surfactant is prepared. Useful for this application are non-ionic poly(alkylene carbonate) polyahls utilized as starting materials herein or other known poly(alkylene carbonate) polyahls. Also suitable are other non-ionic polymers such as the modified poly(alkylene carbonate) polyahls described in co-pending U.S. Applications Serial Nos. 809,675 or 799,211 by the same inventor, which are herein incorporated in their entireties by reference. Other nonionic materials can be used in combination with the present acid-functional surfactants such as polyether polyahls, polyester polyahls, alcohol ethoxylates and phenolic ethoxylates.

The surfactants of this invention can also be used in combination with conventional anionic surfactants. Examples of such conventional anionic surfactants include carboxylic acids, oxyacetates, sulfonates, ether sulfates, phosphates, sulfosuccinates and salts thereof.

The present acid-functional surfactants are used in significantly smaller quantities than the corresponding non-ionic surfactants for a variety of applications. When the acid-functional surfactants are utilized to lower the surface tension of water, only a 10 weight % fraction of the required non-ionic surfactant is needed in many cases.

When used by themselves, the acid-functional surfactants can be effective in amounts between about 0.0002 wt % and about 10 wt %. Preferably, they are added in amounts between about 0.0005 wt % and about 2.0 wt % of the total volume, and still more preferably between about 0.001 wt % and about 1.0 wt %.

When used in a composition with other surfactants, the novel acid-functional polyahls are incorporated in amounts between about 0.0002 wt % and about 5.0 wt % of the total volume, more preferably between about 0.0005 wt % and about 2.0 wt %, and still more preferably between about 0.001 wt and about 1.0 wt %. However, the amount of the present surfactants incorporated into such compositions may also be varied outside of the hereinabove stated range as appropriate or required for different applications.

The amounts of other surfactants incorporated in the compositions can also be varied in accordance with the specific application they are intended for.

Another preferred class of compositions of the present invention are compositions which can function as intermediates for preparing polymers. These compositions have, on the average, at least about two acid-functional end groups per molecule. Higher functionality can be more, and up to about eight inclusively, acid-functional end groups per molecule can be employed.

A wide variety of polymeric materials can be made from the acid-functional compositions of this invention. For example, any polymers can be made that are typically made from polycarboxylic acids, such as, polyesters, polyamides and epoxy resins. The molecular weight and functionality of the resultant polymer can be controlled by the stoichiometry of the reaction. In some cases, it may be desirable to have a high molecular weight polymer whereas in other cases it may be desirable to have a lower molecular weight material with a particular kind of functionality.

Variations in reaction stoichiometry can be illustrated by considering the reactions of the acid-functional poly(alkylene carbonate) polyahls of this invention with epoxy resins. When an equivalent ratio of carboxylic acid to epoxy near 1:1 is used, a relatively high molecular weight resin can be produced. As the equivalent ratio of carboxylic acid to epoxy is lowered, epoxy-functional resins are produced. These epoxy resins are modified with poly(alkylene carbonate) moieties in their backbone. If the equivalent ratio of carboxylic acid to epoxy is increased to above about 1:1, carboxylic acid functional polymers and oligomers are produced in which the polymer backbone has been modified with epoxy resin moieties.

Acid-functional poly(alkylene carbonate) polyahls with greater than about two acidic moieties per molecule are useful for adding controlled amounts of cross-linking to the resultant polymer.

The above discussion generally describes the present invention. A more complete understanding can be obtained by reference to the following specific examples, which are provided herein for purposes of illustration only, and are not intended to be limiting unless otherwise specified.

In the examples, all parts and percentages are by weight unless otherwise indicated. The molecular weights and distributions are determined by size exclusion chromatography (SEC) on Waters Ultrastyragel 1000 Å and 10,000 Å columns arranged in series, using tetrahyrfurane (THF) as the mobil phase and calibrated with narrow molecular weight poly(ethylene glycol) standards.

EXAMPLES

Example 1

Surfactant Prepared from an Ethylene Carbonate: Diethylene Glycol (50:1) Adduct with Succinic Anhydride A poly(ethylene carbonate) polyol (Sample 1), is prepared from ethylene carbonate (812.8 g, 9.226 mol), diethylene glycol (19.58 g, 0.1845 mol) and sodium stannate the EC conversion is 95.0 wt % and 28.7 wt % $CO_2$. The catalyst is removed by dissolving the product in acetone (20 % in acetone), stirring with anhydrous magnesium silicate (1 g/20 g product) for 2 hours, filtering and stripping the solvent on a rotary evaporator. A portion of the product (26.60 g, 0.0163 mol OH) is combined with succinic anhydride (1.63 g, 0.0163 mol) and sodium stannate trihydrate (0.28 g, 1.0 wt %) and heated at 120 ° C. for one hour. (Sample 23).

The NMR spectroscopic analysis yielded:

| | |
|---|---|
| 2.6–2.7 | $\delta$(singlet, $-O_2CCH_2CH_2CO_2-$, 1.0) |
| 3.6–3.9 | $\delta$(multiplet, $-CH_2OCH_2-$, 11.7) |
| 4.0–4.4 | $\delta$(multiplet, $-CH_2OCO_2CH_2-$, 8.9) |

Titration: 0.609 meq $CO_2H$/g.

EXAMPLE 2

Surfactant Prepared from an Advanced Ethylene Carbonate:Diethylene Glycol (50:1) Adduct with Succinic Anhydride A. A poly(ethylene carbonate) polyol (Sample 2 in Tables Nos. 1 and 2) is prepared from ethylene carbonate and monoethylene glycol (50:1) by a procedure similar to the one in Example 1 above. The product contains 1.75 % OH and 27.6 wt % $CO_2$. A portion of this product (25.00 g, 0.0257 mol OH) is combined with succinic anhydride (2.58 g, 0.0257 mol) and sodium stannate trihydrate (0.27 g, 1.0 wt in a 50 ml, 3-necked flask equipped with overhead stirrer, condenser, thermometer, temperature controller and maintained under a nitrogen atmosphere. The flask is heated to 120 ° C. for one hour. Proton NMR spectroscopic data shows complete conversion of the succinic anhydride. The product (27.0 g) is a very viscous straw-colored liquid (Sample 22).

Mol Wt (by SEC)L $\overline{M}n = 1071$, $\overline{M}w = 3662$, and PDI = 3.33.

Proton NMR spectroscopic data analysis resulted in:

| 2.6–2.7 | δ(singlet, $-O_2CCH_2CH_2CO_2-$, 1.0) |
|---|---|
| 3.6–3.9 | δ(multiplet, $-CH_2OCH_2-$, 7.8) |
| 4.1–4.5 | δ(multiplet, $-CH_2OCO_2CH_2-$, 6.1) |

Titration: 1.168 meq $CO_2H/g$.

B. A portion of Sample 2 is advanced to a higher molecular weight by heating under a 1.3 mm Hg vacuum to a pot temperature of 210 ° C. while removing volatiles overhead (Sample 3; 1.02% OH, 29.3 wt % $CO_2$). A portion of Sample 3 (25.00 g, 0.0150 mol OH) is combined with succinic anhydride (1.5 0 g, 0.0150 mol) and sodium stannate trihydrate (0.26 g, 1.0 wt %) in the same apparatus used in (A) above, and the flask is heated to 120 ° C. for one hour.

Proton NMR spectroscopic analysis indicates complete conversion of the succinic anhydride.

The product (25.5 g) is a very viscous straw-colored liquid (Sample 4).

Determination of Molecular Weight (by SEC): $\overline{M}n = 2749$ $\overline{M}w = 5515$, and PDI = 2.01.

Proton NMR spectroscopic analysis yielded the following results:

| 2.6–2.7 | δ(singlet, $-O_2CCH_2CH_2CO_2-$ 1.0) |
|---|---|
| 3.6–3.9 | δ(multiplet, $-CH_2OCH_2-$, 19.8) |
| 4.1–4.5 | δ(multiplet, $-CH_2OCO_2CH_2-$, 17.3) |

Titration indicated: 0.921 meq $CO_2H/g$.

Example 3

Surfactant Prepared from an Ethylene Carbonate: Diethylene Glycol (200:1) Adduct with Succinic Anhydride A poly(ethylene carbonate) polyol (Sample 5 in Tables Nos. 1 and 2) is prepared from ethylene carbonate (875.2 g, 9.9342 mol), diethylene glycol (5.27 g, 00497 mol) and sodium stannate trihydrate (8.80 g, 1.0 wt %). After 108 hours at 150 ° C., the ethylene carbonate conversion is 94.3 28.2 wt % $CO_2$. The catalyst is removed by the same procedure used in Example 1. The product contains 1.15 % OH and 28.2 wt % $CO_2$. A portion of this product (32.72 g, 0.0221 mol OH) is combined with succinic anhydride (2.21 g, 0.0221 mol) and sodium stannate trihydrate (0.35 g, 1.0 wt and heated at 120 ° C. for one hour (Sample 6).

Proton NMR spectroscopic analysis yielded:

| 2.6–2.7 | δ(singlet, $-O_2CCH_2CH_2CO_2-$, 1.0) |
|---|---|
| 3.6–3.9 | δ(multiplet, $-CH_2OCH_2-$, 13.8) |
| 4.1–4.5 | δ(multiplet, $-CH_2OCO_2CH_2-$, 10.5) |

Titration: 0.599 meq $CO_2H/g$.

Example 4

Surfactant Prepared from an Advanced Ethylene Carbonate:Monoethylene Glycol (100:1) Adduct with Succinic Anhydride A poly(ethylene carbonate) polyol (Sample 7) is prepared from ethylene carbonate and monoethylene glycol (100:1) by a procedure similar to Example 1. A portion of the product (catalyst removed) is advanced to higher molecular weight by heating under a 0.5 mm Hg vacuum to a pot temperature of 220 ° C. while removing volatiles overhead (Sample 8). This product contains 0.46 % OH and 30.0 wt % $CO_2$.

A portion of the product (25.5 g, 0.00691 mol) is combined with succinic anhydride (0.69 g, 0.00691 mol) and sodium stannate trihydrate (0.26 g, 1.0 wt %) and heated at 120 ° C. for one hour (Sample 9).

Proton NMR spectroscopic analysis yielded:

| 2.6–2.7 | δ(singlet, $-O_2CCH_2CH_2CO_2-$, 1.0) |
|---|---|
| 3.6–3.9 | δ(multiplet, $-CH_2OCH_2-$, 45.5) |
| 4.1–4.5 | δ(multiplet, $-CH_2OCO_2CH_2-$, 37.0) |

Example 5

Surfactants Prepared from P-400 Modified Poly(Ethylene Carbonate) Polyols and Succinic Anhydride A poly(ethylene carbonate) polyol (Sample 10) is prepared from ethylene carbonate (379.07 g, 4.3027 mol), diethylene glycol (9.13 g, 0.0861 mol) and sodium stannate trihydrate (3.88 g, 1.0 wt %). After 46 hours at 150 ° C., the ethylene carbonate conversion is 96.2 %; 29.6 wt % $CO_2$ (by NMR). A portion of Sample 10 (262.3 g, 75 wt %) as described in Tables 1 and 2 containing the sodium stannate catalyst and P-400 (a poly(-propylene glycol) of Mn 400, Dow Chemical Co., Midland, MI) (87.4 g, 25 wt %) is heated at 150 ° C for 4.75 hours to effect transesterification. The catalyst is then removed by the same procedure used in Example 1. The product is Sample 11 (328 g, 3.36 % OH, 21.1 wt % $CO_2$).

A. A portion of Sample 11 (27.08 g, 0.0472 mol OH) as described in Tables 1 and 2 is combined with succinic anhydride (4.72 g, 0.0472 mol) and sodium stannate trihydrate (0.32 g, 1.0 wt %) and heated at 120 ° C for one hour (Sample 12).

Proton NMR spectroscope analysis yielded:

| 0.9–1.3 | δ(multiplet, $CH_3-$, 1.8) |
|---|---|
| 2.6–2.7 | δ(singlet, $-O_2CCH_2CH_2CO_2-$, 1.0) |
| 3.2–3.9 | δ(multiplet, ether, 5.4) |
| 4.0–4.4 | δ(multiplet, $-CH_2OCO_2CH_2-$, 2.6) |

Titration: 1.851 meq $CO_2H/g$.

B. A portion of Sample 11 is advanced to higher molecular weight by heating under a 0.1 mm Hg vacuum to a pot temperature of 184 °C while removing volatiles (mainly diethylene glycol) overhead. (Sample 13; 3.37% OH, 19.8% $CO_2$).

A portion of Sample 13 (20.29 g, 0.0178 mol OH) is combined with succinic anhydride (1.78 g, 0.0178 mol) and sodium stannate trihydrate (0.22 g, 1.0 wt %) and heated at 120 °C for one hour (Sample 14).

Proton NMR spectroscopic analysis yielded:

| 0.9–1.3 | $\delta$(multiplet, $CHC_3-$, 4.7) |
|---|---|
| 2.6–2.7 | $\delta$(singlet, $-O_2CCH_2CH_2CO_2-$, 1.0) |
| 3.2–3.9 | $\delta$(multiplet, ether, 13.2) |
| 4.0–4.4 | $\delta$(multiplet, $-CH_2OCO_2CH_2-$, 7.2) |

Titration: 0.909 meq $CO_2H/g$.

C. A portion of Sample 11 is advanced to higher molecular weight by heating under a 0.1 mm Hg vacuum to a pot temperature of 220 °C while removing volatiles (mainly diethylene glycol) overhead (Sample 15; 0.56 % OH, 20.9 % $CO_2$). A portion of Sample 15 (22.5 g, 0.0074 mol OH) is combined with succinic anhydride (0.74 g, 0.00740 mol) and sodium stannate trihydrate (0.23 g, 1.0 wt %) and heated at 20 °C for one hour (Sample 16). 10 copic analysis yielded:

Proton NMR spectros

| 0.9–1.4 | $\delta$(multiplet, $CH_3$, 12.4) |
|---|---|
| 2.6–2.7 | $\delta$(singlet, $-O_2CCH_2CH_2CO_2-$, 1.0) |
| 3.2–3.9 | $\delta$(multiplet, ether, 34.6) |
| 4.0–4.4 | $\delta$(multiplet, $-CH_2OCO_2CH_2-$, 17.2) |

Example 6

Surfactants Prepared from P-1200 MOdified poly(Ethylene Carbonate) Polyols and Succinic Anhydride A poly(ethylene carbonate) polyol (Sample 16) is prepared from ethylene carbonate (402.0 g, 4.5630 mol), diethylene glycol (9.68 g, 0.0913 mol) and sodium stannate trihydrate (4.12 g, 1.0 wt %). After 45 hours at 150 °C, the ethylene carbonate conversion was 95.8 %; 30.5 wt % $CO_2$ (by NMR). A portion of Sample 16 (285.8 g, 75 wt %) containing the sodium stannate catalyst and P-1200 (a poly(propylene glycol) of Mn 1200, Dow Chemical Co.) (95.3 g, 25 wt %) are heated at 150 °C for 6½ hours to effect transesterification. The catalyst was removed as in Example 1 above (Sample 17, 22.9 wt % $CO_2$).

A. A portion of Sample 17 (37.58 g, 0.0328 mol OH) is combined with succinic anhydride (3.28 g, 0.0328 mol) and sodium stannate trihydrate 0.41 g, 1.0 wt %) and heated at 120 °C. for one hour (Sample 18).

Proton NMR spectroscopic analysis yielded:

| 0.9–1.3 | $\delta$(multiplet, $CH_3-$, 4.7) |
|---|---|
| 2.6–2.7 | $\delta$(singlet, $-O_2CCH_2CH_2CO_2-$, 1.0) |
| 3.2–3.9 | $\delta$(multiplet, ether, 14.2) |
| 4.0–4.4 | $\delta$(multiplet, $-CH_2OCO_2CH_2-$, 7.0) |

Titration: 0908 meq $CO_2H/g$.

B. A portion of Sample 17 is advanced to higher molecular weight by heating under a 3-4 mm Hg vacuum to a pot temperature of 216 °C. while removing volatiles (mainly diethylene glycol) overhead (Sample 18; 1.19% OH and 21.7 wt % $CO_2$). A portion of Sample 18 (24.32 g, 0.01702 mol OH) is combined with succinic anhydride (1.70 g, 0.01702 mol) and sodium stannate trihydrate (0.26 g, 1.0 wt %) and heated at 120 °C for one hour (Sample 19).

Proton NMR spectroscopic analysis yielded:

| 0.9–1.3 | $\delta$(multiplet, $CH_3-$, 5.4) |
|---|---|
| 2.6–2.7 | $\delta$(singlet, $O_2CCH_2CH_2CO_2-$, 1.0) |
| 3.2–3.9 | $\delta$(multiplet, ether, 16.7) |
| 4.0–4.4 | $\delta$(multiplet, $-CH_2OCO_2CH_2-$, 8.6) |

Titration: 0.790 meq $CO_2H/g$.

C. A portion of Sample 17 is advanced to higher molecular weight by heating under a 0.2-1 mm Hg vacuum to a pot temperature of 237 °C. while removing volatiles (mainly diethylene glycol) overhead (Sample 20; 0.41 % OH and 19.3 wt % $CO_2$). A portion of Sample 20 (17.7 g, 0.00427 mol OH) and sodium stannate trihydrate (0.18 g, 1.0 wt %) and heated at 120 °C. for one hour (Sample 21).

Proton NMR spectroscopic analysis yielded:

| 0.9–1.4 | $\delta$(multiplet, $CH_3$, 18.0) |
|---|---|
| 2.6–2.7 | $\delta$(singlet, $-O_2CCH_2CH_2CO_2-$, 1.0) |
| 3.2–3.9 | $\delta$(multiplet ether, 56.7) |
| 4.0–4.4 | $\delta$(multiplet, $-CH_2OCO_2CH_2-$, 30.0) |

Example 7

Surfactant Prepared From 1,12-Diaminododecane Modified Poly(Ethylene Carbonate) Polyahl and Succinic Anhydride A poly(ethylene carbonate) polyol ($\overline{Mn}$ of 2076, 27.4 wt $CO_2$) is prepared from ethylene oxide and carbon dioxide using diethylene glycol as initiator.

A sample of the poly(ethylene carbonate) polyol (100.5 g) and 1,12-diaminododecane (20.04 g) are combined in a 250 ml flask equipped with condenser, thermometer, and overhead stirrer and maintained under a nitrogen cover. The flask is heated for 4 hours at 125 °C. On cooling to ambient temperature, the product (116.6 g) is a white wax ($\overline{Mn}$ of 1184).

A portion of the white wax (84.6 g, 0.221 mol end groups) and succinic anhydride (22.0 g, 0.221 mol) are combined and heated for one hour at 120 °C. in the same equipment as used above. Size exclusion chromatography shows about 100 % succinic anhydride conversion. Proton NMR spectroscopic analysis yielded:

| 1.2–1.6 | $\delta$(singlet, $(-CH_2)_{10}-$ 1.0) |
|---|---|
| 2.6–2.8 | $\delta$(singlet $-O_2CCH_2CH_2CO_2-$, 2.5) |
| 3.4–3.9 | $\delta$(multiplet, $-CH_2OCH_2-$, 15.3) |
| 4.0–4.5 | $\delta$(multiplet, $-CH_2OCO_2CH_2-$, 5.6) |

Surface tension is 52.8 dynes/cm (0.1 % aqueous solution of the ammonium salt; 23 °C).

This example shows that polyamines can be used to make the novel compositions of this invention.

Example 8

Surfactant Prepared From 1,10-Decanediol Modified Poly(Ethylene Carbonate) Polyol and Succinic Anhydride A sample of the same poly(ethylene carbonate) polyol used in Example 7 (100.8 g), 1,10-decanediol (17.40 g) and sodium stannate trihydrate (0.59 g) are combined in the same equipment used in Example 7. The flask is heated for 3 hours at 150° C. On cooling to ambient temperature, the product (116.5 g) is a light straw-colored viscous liquid ($\overline{Mn}$ 1,179).

A portion of the viscous liquid (83.3 g, 0.221 mol OH) and succinic anhydride (22.0 g, 0.221 mol) are combined and heated for one hour at 120° C. in the same equipment as used above. Size exclusion chromatography shows about 100 % succinic anhydride conversion.

The product is a light yellow viscous liquid having a Brookfield viscosity of 27,100 cps at 25° C.; $\overline{Mn}$ is 1301.

Proton NMR spectroscopic analysis yielded:

| | |
|---|---|
| 1.2–2.0 | δ(multiplet, —(CH$_2$)$_{10}$—, 1.0) |
| 2.6–2.8 | δ(singlet, —O$_2$CCH$_2$CH$_2$CO$_2$—, 2.9) |
| 3.4–3.9 | δ(multiplet, —CH$_2$OCH$_2$—, 17.5) |
| 4.0–4.5 | δ(multiplet, —CH$_2$OCO$_2$CH$_2$—, 7.8) |

Surface tension is 48.0 dynes/cm (0.1 % aqueous solution of the ammonium salt; 23° C).

This example shows that an oleophilic diol can be used to make the novel compositions of this invention.

The data corresponding to the above examples are given in the Tables hereinbelow. Table 1 contains information on the starting materials whereas Table 2 has information on the properties of the polymers obtained.

TABLE 1

Summary of Properties of Poly(Ethylene Carbonate) Polyol Starting Materials

| Polyol Sample No. | SEC Data | | | | Hydroxyl Titration | | | Surfactant Sample No. |
|---|---|---|---|---|---|---|---|---|
| | Peak | Mn | Mw | PDI | Wt % OH | Mol. Wt. | Wt % CO$_2$ | |
| A. Poly(Ethylene Carbonate) Polyol | | | | | | | | |
| 1 | 3044 | 1437 | 3074 | 2.14 | 1.74 | 1954 | 28.7 | 23 |
| 2 | 4086 | 1071 | 3623 | 3.38 | 1.75 | 1943 | 27.6 | 22 |
| 5 | 5256 | 1361 | 4742 | 3.48 | 1.15 | 2957 | 28.2 | 6 |
| 3 | 6219 | 2749 | 5515 | 1.61 | 1.02 | 3338 | 29.3 | 4 |
| 8 | I | I | I | I | 0.46 | 7391 | 30.0 | 9 |
| B. P-400 Modified Poly(Ethylene Carbonate) Polyol | | | | | | | | |
| 11 | 1543 | 755 | 1632 | 2.16 | 3.36 | 1012 | 21.1 | 12 |
| 13 | 4723 | 1739 | 4664 | 2.68 | 1.49 | 2282 | 19.8 | 14 |
| 15 | 10551 | 3596 | 9946 | 2.77 | 0.56 | 6071 | 20.9 | 16 |
| C. P-1200 Modified Poly(Ethylene Carbonate) Polyol | | | | | | | | |
| 17 | 2721 | 1157 | 2759 | 2.38 | N.D. | N.D. | 22.9 | 18 |
| 18 | 5256 | 1851 | 5110 | 2.76 | 1.19 | 2857 | 21.7 | 19 |
| 20 | 11556 | 3365 | 11969 | 3.56 | 0.41 | 8293 | 19.3 | 21 |

I too insoluble in THF for accurate SEC determination
N.D. not determined

TABLE 2

Surfactant Property Profile[a]

| Surfactant Sample No. | meq CO$_2$H/ gm | Surface Tension (dynes/cm) | Wetting Time[b] (Minutes) | Initial Foam Height[c] (mm) | % Foam Stability (after 5 minutes) |
|---|---|---|---|---|---|
| A. Poly(Ethylene Carbonate) Polyol - Succinic Anhydride Adducts | | | | | |
| 23 | 0.609 | 49.8 | 68 | 22 | 0 |
| 22 | 1.168 | 5.29 | 54 | 20 | 0 |
| 6 | 0.599 | 51.5 | 56 | 32 | 0 |
| 4 | 0.921 | 40.6 | 70 | 35 | 0 |
| 9 | N.D. | 54.2 | 48 | 22 | 0 |
| B. P-400 Modified Poly(Ethylene Carbonate) Polyol - Succinic Anhydride Adducts | | | | | |
| 12 | 1.851 | 39.7 | 37 | 40 | 15 |
| 14 | 0.909 | 40.1 | 24 | 50 | 28 |
| 16 | N.D. | 41.2 | 7 | 38 | 32 |
| C. P-1200 Modified Poly(Ethylene Carbonate) Polyol - Succinic Anhydride Adducts | | | | | |
| 18 | 0.908 | 36.3 | 12 | 22 | 18 |
| 19 | 0.790 | 37.4 | 7 | 28 | 48 |
| 21 | N.D. | 37.4 | 10 | 25 | 0 |

[a]Ammonium Salts, 0.1 wt % in Water
[b]Modified Draves-Clarkson Test
[c]Ross-Miles Test
N.D. not determined

Example 9

Acid-Functional Poly(Ethylene Carbonate) Polyahl Prepared From An Advanced Poly(Ethylene Carbonate) Polyol A poly(ethylene carbonate) polyol ($\overline{Mn}$ of 750, 20.0 % CO$_2$) is prepared from ethylene oxide and carbon dioxide using diethylene glycol as initiator. A sample of the poly(ethylene carbonate) polyol (1080.7 g) is placed in a 1l flask and is heated to 235° C. at 10 mm vacuum to produce a higher molecular weight poly(ethylene carbonate) polyol ($\overline{Mn}$ of 2279; 873.4 g).

A portion of this higher molecular weight poly(ethylene carbonate) polyol (505.0 g, 0.443 moles hydroxyl) and succinic anhydride (44.30 g, 0.443 moles) are combined and heated with stirring for 2 hours at 120° C. Proton NMR spectroscopic analysis indicates essentially complete anhydride conversion. Titration of the carboxylic acid end groups with 0.1 N NaOH indicates a molecular weight of 2498. Carbon-13 NMR analysis is consistent with the expected structure.

Example 1

Acid-Functional Poly(Ethylene Carbonate) Polyahl Prepared From an Advanced Poly(Ethylene Carbonate) Polyol The poly(ethylene carbonate) polyol ($\overline{Mn}$ of 750) starting material used in Example 9 (853.7 g) is heated to 171° C at 10 mm vacuum to produce a higher molecular weight poly(ethylene carbonate) polyol ($\overline{Mn}$ of 980 by SEC; 819.0

A portion of this higher molecular weight poly(ethylene carbonate) polyol (818.9 g, 1.67 moles hydroxyl) and succinic anhydride (167.13 g, 1.67 moles) are combined and heated with stirring for 2 hours at 120° C. Proton NMR spectroscopic analysis indicates essentially complete anhydride conversion. Titration of the carboxylic acid end groups indicate a molecular weight of 1050. Carbon-13 NMR analysis is consistent with the expected structure.

Examples 9 and 10 illustrate a preferred procedure for making the products of this invention wherein no catalyst is used.

Example 11

Reaction Products of Acid-Modified Poly(Ethylene Carbonate) Polyahls with Epoxy Resins A portion of the acid-functional poly(ethylene carbonate) polyol product of Example 10 (105.0 g, 0.200 moles —$CO_2H$), DER 383 (a liquid epoxy resin based on bisphenol A and epichlorohydrin, Dow Chemical Co.) (73.6 g, 0.402 moles epoxy) and A-1 (a phosphonium acetate catalyst, 0.94 g, 0.5 wt %) are combined in a 250 ml flask equipped with overhead stirring, thermometer and heater, and maintained under a nitrogen atmosphere. The contents of the flask are heated at 110° C. for 75 minutes and then cooled to ambient temperature. The product is a viscous amber liquid with the following properties: epoxy equivalent weight is 940; Brookfield viscosity is 890,000 cps at 25° C. Carbon-13 NMR and SEC analysis yield results which are consistent with the expected structure of an epoxy resin containing a poly(ethylene carbonate) backbone.

A portion of this resin (62.5 g) is advanced to a higher molecular weight resin by heating with bisphenol A (6.67 g) for 1 hour at 125° C. Size exclusion chromatography indicated complete bisphenol A conversion. The product is a viscous brown liquid with an epoxy equivalent weight of 4185.

This experiment shows that the acid-functional poly(alkylene carbonate) polyahls of this invention can function as polymer intermediates by reacting with epoxy resins to produce higher molecular weight epoxy resins containing poly(alkylene carbonate) moieties in their backbone.

It is understood that various other modifications will be apparent to, and can readily be made by, those skilled in the art without departing from the scope and spirit of this invention. Accordingly, it is not intended that the scope of the claims appended hereto be limited to the description of said forth herein, but rather that the claims be construed as encompassing all the patentable novelty features that reside in the present invention, including all features that would be treated as equivalents thereof by those skilled in the art to which this invention pertains.

What is claimed as new and desired to be secured by letters patent of the United States is:

1. An acid-functional polymer having a poly(alkylene carbonate) backbone and on the average greater than one terminal acid group per molecule, wherein the poly(alkylene carbonate) backbone contains at least one modifier.

2. The acid-functional polymer of claim 1, wherein said modifier is selected from the group consisting of
   polyamines,
   polyesters,
   cyclic anhydrides, and
   polyahls containing two or more functional groups.

3. The polymer of claim 2, wherein said modifier is a polyahl selected from the group consisting of
   polyols,
   polyamines,
   polymercaptans and
   polyacids.

4. The polymer of claim 3, wherein said modifier is a polyol selected from the group consisting of
   polyether polyols an
   polyester polyols.

5. A composition comprising
   between about 5 wt % and 95 wt % of the polymer of claim 1, and
   between about 95 wt % and 5 wt % of a non-ionic polymer.

6. A composition comprising
   between about 5 wt % and 95 wt % of the polymer of claim 1, and
   between about 95 wt % and 5 wt % of a different anionic polymer.

7. A composition comprising the reaction product of an acid-functional polyahl having a poly(alkylene carbonate) backbone and on the average greater than one terminal acid group per molecule, and acompound selected from the group consisting of polyahls and epoxy resins.

8. The composition of claim 7 wherein the compound is an aliphatic, aromatic or heterocyclic epoxy resin.

9. The composition of claim 8 wherein the compound is an epoxy resin comprising a glycidyl ether of bisphenol A.

10. The composition of claim 8 wherein the equivalent ratio of epoxy resin to the acid-functional polyahl is greater than 1 and the composition is an epoxy-functional resin having a poly(alkylene carbonate) backbone containing at leat one modifier.

11. The composition of claim 8 wherein the equivalent ratio of epoxy resin to the acid-functional polyahl is less than 1 and the composition is an acid-functional polymer modified with epoxy resin moieties.

12. The composition of claim 7 wherein the poly(alkylene carbonate) backbone of the acid-functional polyahl contains at least one modifier.

13. The composition of claim 12 wherein the compound is an aliphatic, armoatic or heterocyclic epoxy resin.

14. The composition of claim 13 wherein the equivalent ratio of epoxy resin to the acid-functional polyahl containing at least one modifier in the backbone is less than 1.

15. The composition of claim 13 wherein the equivalent ratio of epoxy resin to the acid-functional polyahl containing at least one modifier in the backbone is greater than 1.

* * * * *